Aug. 21, 1928.　　　　　G. J. THOMAS　　　　　1,681,630
VEHICLE WHEEL BRAKE
Original Filed Nov. 4, 1924
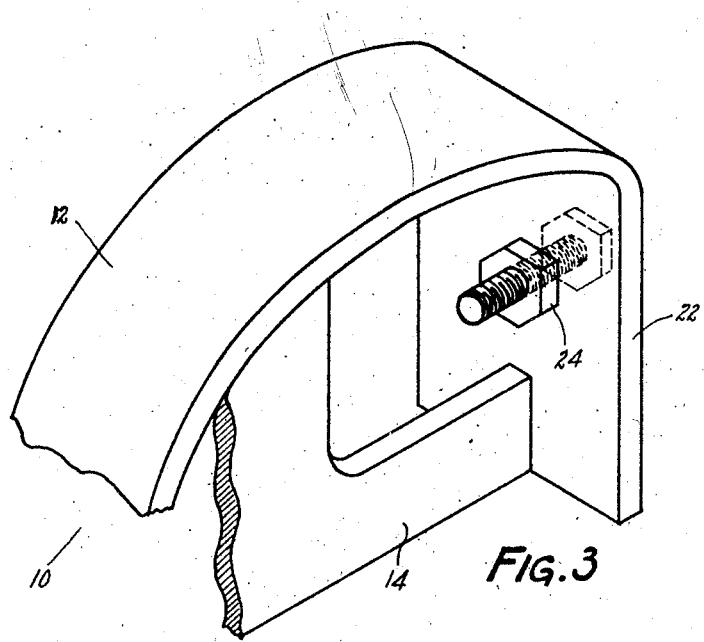
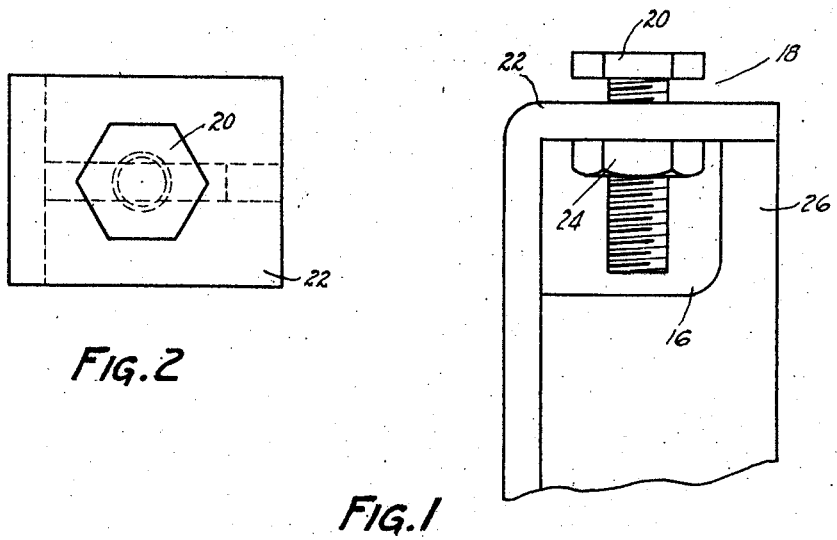
INVENTOR
GEORGE J. THOMAS
BY
ATTORNEY Patented Aug. 21, 1928.

1,681,630

UNITED STATES PATENT OFFICE.

GEORGE JOSEPH THOMAS, OF SOUTH BEND, INDIANA, ASSIGNOR TO BENDIX BRAKE COMPANY, OF CHICAGO, ILLINOIS, A CORPORATION OF ILLINOIS.

VEHICLE WHEEL BRAKE.

Application filed November 4, 1924, Serial No. 747,707. Renewed June 27, 1928.

This invention relates to brakes and is illustrated as embodied in a shoe for an internal expanding automobile brake. An object of the invention is to form a surface structure at one end of the shoe comprising an adjustable and detachable part cooperating both with the body of the shoe and with the applying mechanism. A further object of the invention resides in the provision of a simple but nevertheless efficient shoe structure which may be provided with a recess extending into its end and a part crossing said recess, in combination with a cam engaging thrust member threaded through said part and extending into the recess.

In the attainment of the above objects, the web portion of the shoe is preferably recessed at its end, the recess being covered by a substantially radially extending inturned band or rim part of the shoe through which an adjustable thrust part may be threaded.

The above and other objects will be apparent to one skilled in this art after a study of the specification taken in connection with the annexed drawing wherein:

Figure 1 is a fragmentary view of one of the shoes disclosing in detail the essentials of my invention;

Figure 2 is an end view of Figure 1; and

Figure 3 is a perspective view of the cam engaging structure.

In the embodiment selected for illustration I provide a novel shoe 10, the invention being particularly directed to a novel cam engaging end structure of the same. The shoe preferably comprises an outer friction or rim part 12, upon which may be mounted the conventional friction lining and a reinforcing web part 14 preferably extending at right angles to the friction part 12.

At the cam engaging end of the shoe the web is preferably recessed, indicated in Figure 1 at 16, said recess adapted to accommodate a cam engaging or thrust member 18. The thrust member 18 preferably has its cam engaging face 20 hardened, and may comprise an adjustable screw which may be threaded through an inturned, substantially radially extending end 22 of the rim part 12. A lock nut 24 may be threaded on the screw within the recess 16 to hold the same in adjustment with the end 22. It will also be noted that web 14, by virtue of the recessed portion 16, is provided with a projection 26 against which the end 22 abuts.

It is to be seen, therefore, that I have provided a simple and yet practical shoe structure embodying a novel cam engaging part readily adjustable and replaceable.

While I have shown how my invention may be applied in practice, I do not wish to be limited to the exact detail disclosed and described, but only so far as may be embraced by the terms of the appended claims.

Having thus described my invention what I claim is:

1. A brake shoe having a stiffening web with a recess cut inwardly from one end, in combination with an adjustable thrust member having a part extending into said recess.

2. A brake shoe having a stiffening web with a recess cut inwardly from one end and with a part extending across the recess, in combination with an adjustable thrust member threaded into said part and having a part extending into said recess.

3. A brake shoe having an outer friction part and a stiffening web jointly forming a T-section shoe, and with the web cut away at one end to form a recess and the end of said friction part extending inwardly across said recess, in combination with a thrust part carried by the inwardly-extending part of the friction part and extending into said recess.

4. A brake shoe having an outer friction part and a stiffening web jointly forming a T-section shoe, and with the end of said friction part extending inwardly across the end of the web, in combination with a thrust part adjustably carried by the inwardly-extending part of the friction part.

5. A brake shoe having an outer friction part and a stiffening web jointly forming a T-section shoe, and with the web cut away at one end to form a recess and the end of said friction part extending inwardly across said recess, in combination with a thrust part threaded through the inwardly-extending part of the friction part.

6. A brake shoe formed with a recess extending into its end and with a part crossing said recess, in combination with a thrust member adjustably carried by said part and extending into the recess.

7. A brake shoe formed with a recess extending into its end and with a part crossing said recess, in combination with a thrust member threaded through said part and extending into the recess.

In testimony whereof, I affix my signature.

GEORGE JOSEPH THOMAS.